(12) United States Patent
Hilton et al.

(10) Patent No.: US 9,744,687 B2
(45) Date of Patent: Aug. 29, 2017

(54) ARTIFICIAL REEF AND PROCESS FOR FORMING SUCH AN ARTIFICIAL REEF

(71) Applicant: ATLANTIS MARINE HABITATS, LLC, Arcola, TX (US)

(72) Inventors: Thomas J. Hilton, Arcola, TX (US); Wayne Bauer, Cape Coral, FL (US)

(73) Assignee: ATLANTIS MARINE HABITATS, LLC, Arcola, TX (US)

( * ) Notice: Subject to any disclaimer, the term of this patent is extended or adjusted under 35 U.S.C. 154(b) by 0 days.

(21) Appl. No.: 15/225,318

(22) Filed: Aug. 1, 2016

(65) Prior Publication Data

US 2017/0028585 A1 Feb. 2, 2017

Related U.S. Application Data

(63) Continuation-in-part of application No. 14/938,543, filed on Nov. 11, 2015, now Pat. No. 9,403,287, which is a continuation of application No. 14/291,958, filed on May 30, 2014, now Pat. No. 9,498,901.

(51) Int. Cl.
  *E02B 3/04*   (2006.01)
  *B28B 1/32*   (2006.01)
  *B28B 11/24*  (2006.01)
  *B28B 7/18*   (2006.01)
  *B29C 41/08*  (2006.01)

(52) U.S. Cl.
  CPC ............... *B28B 1/32* (2013.01); *B28B 7/18* (2013.01); *B28B 11/245* (2013.01); *E02B 3/046* (2013.01); *B29C 41/08* (2013.01)

(58) Field of Classification Search
  CPC ........ A01K 61/70; A01K 61/59; E02B 3/046; E02B 7/02; B29C 41/08
  See application file for complete search history.

(56) References Cited

U.S. PATENT DOCUMENTS

| | | | |
|---|---|---|---|
| 2,069,715 A | 2/1937 | Arpin | |
| 3,888,209 A | 6/1975 | Boots | |
| 4,244,993 A * | 1/1981 | Platka, III | B29C 41/22 264/138 |
| 4,997,311 A | 3/1991 | Van Doren | |
| 5,173,006 A | 12/1992 | Lowe | |

(Continued)

OTHER PUBLICATIONS

Instructables.com, Build an Artificial Reef, Jan. 18, 2014, http://web.arch ive.org/web/20140118140102/http://www.i nstructables.com/id/Build-an-Artificial-Reef.*

*Primary Examiner* — Rodney Mintz
*Assistant Examiner* — Daniel Kenny
(74) *Attorney, Agent, or Firm* — Egbert Law Offices, PLLC

(57) ABSTRACT

A process for forming an artificial reef includes forming a form having a geometric shape, applying at least one blockout onto a surface of the form such that the blockout extends outwardly of the surface of the form, applying a sprayable concrete over the form and over a portion of the blockout, curing the sprayable concrete on the form for a period of time such that the sprayable concrete adheres to the blockout, and removing the cured sprayable concrete and the blockout from the surface of the form. The blockout is of a cast concrete material such as a cinder block. The blockout has openings therein so as to open to an interior of the artificial reef.

11 Claims, 4 Drawing Sheets

(56) References Cited

U.S. PATENT DOCUMENTS

| | | |
|---|---|---|
| 5,259,695 A | 11/1993 | Mostkoff |
| 5,454,665 A | 10/1995 | Hughes |
| D417,314 S * | 11/1999 | Smith, Jr. .................... D30/106 |
| 6,186,702 B1 | 2/2001 | Bartkowski |
| 6,464,429 B2 | 10/2002 | Moore |
| 6,896,445 B1 | 5/2005 | Engler |
| 7,513,711 B1 | 4/2009 | Walter |
| 7,828,493 B1 | 11/2010 | Brignac |
| 8,147,165 B2 * | 4/2012 | Sung ..................... A01K 61/70 |
| | | 119/221 |
| 9,403,287 B2 | 8/2016 | Hilton |

* cited by examiner

ARTIFICIAL REEF AND PROCESS FOR FORMING SUCH AN ARTIFICIAL REEF

CROSS-REFERENCE TO RELATED APPLICATIONS

The present application is a continuation-in-part of U.S. patent application Ser. No. 14/938,543, filed on Nov. 11, 2015, and entitled "Process for Forming an Artificial Reef", which issued as U.S. Pat. No. 9,403,287 on Aug. 2, 2016. U.S. patent application Ser. No. 14/938,543 is a continuation of U.S. patent application Ser. No. 14/291,958, filed on May 30, 2014, and entitled "Process for Forming an Artificial Reef", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to artificial reefs. Additionally, the present invention relates to processes for forming such artificial reefs. More particularly, the present invention relates to processes for forming artificial reefs in which a sprayable concrete is used for the formation of the artificial reef. Additionally, the present invention relates to the use of cinder blocks in conjunction with artificial reefs.

2. Description of Related Art Including Information Disclosed Under 37 CFR 1.97 and 37 CFR 1.98.

An artificial reef is a man-made structure typically built to promote marine life in areas having generally featureless bottoms. Artificial reefs are used to control erosion and/or to improve surfing. Many reefs are built by using objects that were built for other purposes, for example, by sinking oil platform jackets, scuttling ships, or by deploying rubble or construction debris.

Scuttling ships is an extremely costly and time-consuming way to produce an artificial reef since there are many logistical hurdles to be overcome due to stringent governmental regulations. The ships must be stripped clean of any and all potential pollutants. As a result, the engines and fuel tanks must be removed. PCBs are common substance in many older ship designs. These PCBs must be removed before the ship is scuttled. There also minimum depth requirements set forth by the USCG which makes the structures undesirable for deployment in waters less than 150 feet.

The Rigs-to-Reefs program has been very successful as a result of state fishery agencies working closely with oil companies to help defray the cost of deploying these offshore large structures. This can be attractive to oil companies since many times the cost of deploying is less than the cost of bringing the rigs back inshore and sold for scrap. This type of reef has minimum depth requirements, stringent regulations regarding the removal of contaminants, and is very costly to deploy.

Designed artificial reefs can be placed in shallower waters and are meant to provide the underlayment for the development of what eventually will considered a "natural" reef by incorporating elements conducive to making this happen. Artificial reefs divert the current flow in order to provide adequate cover and refuge so as to allow small marine creatures to gain a foothold instead of being continually swept along with the ocean currents. These artificial reefs are placed above the flat, featureless ocean floor. Artificial reefs are designed to stand alone or be deployed in unison with a number of other reefs and/or placement of low relief material, such as rubble or concrete culverts. Concrete is a good material used for artificial reef construction, but it has inherent issues since it lacks correct pH values in addition to being too hard for benthic marine organisms to bore into. As such, it is very important to provide natural soft limestone as a primary surface materials.

Artificial reefs are somewhat expensive to be produced. Typically, a metal infrastructure is required for the artificial reef. Typically, a metal infrastructure is installed within a mold and concrete is poured around the metal infrastructure. Unfortunately, this metal infrastructure can degrade over time because of contact with salt water. As a result, the artificial reef can degrade over time. Typically, the construction of such artificial reefs requires a number of persons to complete. The curing time for the concrete can be several days. As such, production of such artificial reefs is very expensive, time-consuming and labor-intensive. Still further, where metal infrastructure is utilized in the artificial reef, welding is required. This welding will degrade because of contact with the saltwater. Additionally, the cost of steel associated with such a metal infrastructure makes the artificial reefs very expensive.

In certain circumstances, solid triangular blocks of concrete are utilized as artificial reefs. Typically, these solid blocks can cause proper interruption of the ocean current, but lack an area on the interior thereof whereby small marine animals can develop. In those artificial reefs that have an internal chamber, turtles can become trapped. As such, such structures lack proper turtle escape hatches whereby turtles can escape from the interior of such artificial reefs. Still further, the bottoms of such artificial reefs can be relatively small. As such, they can sink into the ocean floor or become swept away with strong ocean currents. As such, a need has developed so as to provide an artificial reef which overcomes the problems associated with the prior art.

In the past, a variety of patents have issued with respect to such artificial reefs. For example, U.S. Pat. No. 2,069,715, issued on Feb. 2, 1937 to J. P. Arpin, is an early patent dealing with artificial reefs. This structuring includes an elongated U-shaped member that is substantially triangular in cross-section and hollow. The outer longitudinal edges at the base portion have inclined soil-penetrating toes. The portion of the base intermediate the longitudinal edges are provided with penetrating lugs.

U.S. Pat. No. 3,888,209, issued on Jun. 10, 1974 to E. R. Boots, describes a method and apparatus for preventing erosion of a beach. This method and apparatus includes an artificial reef for subsurface placement adjacent a shoreline. The artificial reef is made of a base reef set on the seabed and an upper reef preformed and mounted to the base reef.

U.S. Pat. No. 4,997,311, issued on Mar. 5, 1991 to T. A. Van Doren, describes an artificial reef that employs a dome-shaped, thin-walled enclosure of plastic material having apertures therein to permit aquatic life to enter and exit. The enclosure has a circular perimeter that is provided with a circumferential trough integrally formed with the enclosure. A concrete ballast is poured into the trough to form a perimetrical weight which holds the reef in position on the desired underwater surface.

U.S. Pat. No. 5,173,006, issued on Dec. 22, 1992 to W. R. Lowe, provides an artificial reef structure in the form of a truncated pyramid structure. This artificial reef is assembled on site. The artificial reef structure is comprised of identical panels forming openings at the top and bottom of the artificial reef and forming an opening in the side of the artificial reef at a variable distance from the bottom of the structure so as to control the sinking of the structure and the sand held by the structure.

U.S. Pat. No. 5,259,695, issued on Nov. 9, 1993 to B. J. Mostkoff, provides an artificial reef having an equilateral tetrahedron and having four equilateral sides in which an equilateral triangle is disposed. Tire chips are placed within the artificial reef and held in place by cement. The artificial reef is formed with an open-ended three-sided mold.

U.S. Pat. No. 5,454,665, issued on Oct. 3, 1995 to R. K. Hughes, shows an artificial reef for use in a body of water. The reef is formed by providing an anchoring structure which is submerged. The anchoring structure has a weight sufficient to anchor the artificial reef to the floor of the body of water. Each of the reef assemblies is formed from a base which is secured to the anchoring structure. A flexible elastomeric sleeve is coupled to a lower end of a buoyant elongated member formed from a substantially rigid polymeric material so that the elongated members are held in a generally upright position.

U.S. Pat. No. 6,464,429, issued on Oct. 15, 2002 to M. D. Moore, provides an artificial reef module for coral reef remediation. The artificial reef includes a central body having an upper settling plate, a middle settling plate, and a lower settling plate. A plurality of primary tines extend from the central body and include a plurality of secondary tines extending therefrom. The primary tines include the supporting tines, the stabilizing tines, and the space-filling tines. The branching of these tines closely replicates the appearance of natural branching coral.

U.S. Pat. No. 6,896,445, issued on May 24, 2005 to E. Engler, discloses a modular artificial reef that can be placed in stacked structures along the floor of a body of water. The artificial reef includes a top wall, a bottom wall and opposed sidewalls and end walls which are interconnected to form a hollow interior. Each of the walls is formed with one or more openings having a size suitable to allow access by marine life and to permit the passage of sunlight therein.

U.S. Pat. No. 7,828,493, issued on Nov. 9, 2010 to C. Brignac, describes an artificial reef structure that utilizes an axle rod supporting a plurality of buoyant reef bodies rotatably mounted on the axle rod. The axle rod and buoyant sections are suspended at a desired level above a water bottom by anchors attached to the anchor lines. A plurality of distally projecting rods is mounted on the buoyant reef bodies.

U.S. Pat. No. 6,186,702, shows another type of artificial reef. The artificial reef is created by pouring concrete into a mold comprised of an inner form and an outer formed with multiple black out creating triangular windows. This artificial reef is deployed alone or with a smaller scale reef inside for fitted with shelves. This is a relatively complex design which is difficult to deploy correctly and easily. The configuration has a smooth surface that is not conducive to attracting marine growth.

U.S. Pat. No. 7,513,711, describes another type of artificial reef. This artificial reef employs the use of soft limestone rock on surface panels. The construction method utilized is a costly and time-consuming method that requires casting six structural elements separately and casting three panels separately. Once all of the components are cured sufficiently over a period of days, they can be lifted and placed together so as to be cast together as a single unit.

The present Applicant is the owner of U.S. Pat. No. 9,403,287, issued on Aug. 2, 2016. This patent describes a process for forming an artificial reef which includes the steps of forming a form having a geometric shape, applying at least one blockout onto a surface of the form such that the blockout extends outwardly of the surface of the form, applying the sprayable concrete over the form and the blockout, curing the sprayable concrete on the form for a period of time, removing the blockout from the surface of the form and from the cured sprayable concrete, and removing the form from the cured sprayable concrete. A base is formed having an upper surface. The lower end of the form is positioned upon the base. A sprayable concrete is sprayed over the upper surface of the base.

During the process of manufacturing the artificial reefs in accordance with the process of U.S. Pat. No. 9,403,287, the present Applicant has discovered that the use of the polymeric blockouts could create difficulties during the manufacturing process. In particular, these blockouts tended to adhere to the sprayable concrete material. As such, additional efforts would were required in order to separate the blockouts from the cured sprayable concrete. Under certain circumstances, the efforts to remove these blockouts often damaged the integrity of the blockouts. As such, the process often required a large number of replacement blockouts for the continued manufacture of the artificial reef.

Additionally, and furthermore, it was found that the use of the blockouts actually reduced the amount of available material on the artificial reef. In other words, that area which was defined by the blockout in the sprayable concrete did not provide a surface for the underwater species to thrive. As such, it was felt that the addition of outwardly extending and relatively irregular surfaces on the exterior of the reef enhanced the ability of the subsea organisms to thrive. Additionally, and furthermore, it was found that the blockouts actually added a significant cost to the artificial reef. In particular, the cost was enhanced when the blockouts needed to be continually repaired and/or replaced. As such, a need developed so as to provide an artificial reef which minimize the cost of the blockout while providing additional surfaces upon which the subsea organisms could thrive.

It is a object of the present invention to provide an artificial reef and process for forming such an artificial reef which minimizes the time and labor requirements for the formation of the artificial reef.

It is another object of the present invention to provide an artificial reef and a process for the forming of the artificial reef that avoids any welding operations.

It is still another object of the present invention to provide an artificial reef and a process for forming the artificial reef which minimizes the amount of steel and avoids the cost of such steel.

It is still another object of the present invention to provide an artificial reef and a process for forming the artificial reef which includes limestone surfaces suitable for allowing marine organisms and microorganisms to hold onto.

It is a further object of the present invention to provide an artificial reef and a process for forming the artificial reef which creates a large footprint in order to avoid sinking into the floor of the body of water or being swept away by ocean currents.

It is another object of the present invention to provide an artificial reef and a process for forming the artificial reef in which the artificial reef is attractive to marine life.

It is still further object of the present invention to provide an artificial reef and a process for the forming of the artificial reef which provides greater longevity to the artificial reef.

It is another object of the present invention to provide an artificial reef and a process for the forming of the artificial reef in which the artificial reef is stronger than prior artificial reef structures.

It is still another object of the present invention to provide an artificial reef and a process for the forming of the artificial reef which creates an artificial reef which allows water circulation therethrough and for small animals to enter into the interior of the artificial reef.

It is another object of the present invention to provide an artificial reef and a process for forming the artificial reef which provides outwardly extending surfaces for which subsea organisms can thrive.

It is still a further object of the present invention provide an artificial reef and a process for forming the artificial reef which minimizes the cost of the artificial reef structure.

These and other objects and advantages of the present invention will become apparent from a reading of the attached specification and appended claims.

BRIEF SUMMARY OF THE INVENTION

The present invention is a process for forming an artificial reef. This process includes the steps of: (1) forming a form having a geometric shape; (2) applying at least one blockout onto a surface of the form such that the blockout extends outwardly of the surface of the form; (3) applying a sprayable concrete over the form and over a portion of the blockout; (4) curing the sprayable concrete on the form for a period of time such the sprayable concrete adheres to the blockout; and (5) removing the cured sprayable concrete and the blockout from the surface of the form.

In the present invention, the blockout is formed of a cast concrete material. In particular, this cast concrete material is a cinder block. The blockout has openings therethrough such that the openings open to the interior of the artificial reef.

A rod can be applied onto the form so as to have a portion extending outwardly of the surface of the form. The step of applying concrete include spraying the sprayable concrete over a portion of the rod.

The step of forming includes forming a generally pyramid-shaped form having an upper end and a lower end, forming a base, and then placing the lower end of the generally pyramid-shaped form upon the base. The base has an upper surface extending outwardly of a perimeter of the lower end of the generally pyramid-shaped form. The sprayable concrete is sprayed onto the upper surface of the base outwardly of the perimeter of the lower end of the generally pyramid-shaped form.

In the process of the present invention, a plurality of limestone surfaces can be applied on to an outer surface of the sprayable concrete during the step of curing. A concrete release agent can also be applied on to the form prior to the step of applying the sprayable concrete.

The present invention is also an artificial reef that comprises a structure formed of a concrete material and a plurality of cast concrete members affixed to the structure. Each of the plurality of cast concrete members has an aperture therethrough. The aperture communicates between the interior and exterior of the structure.

In the artificial reef of the present invention, each of the plurality of cast concrete members is a cinder block. Each of these plurality of cast concrete members has a portion extending outwardly of an outer surface of the structure. The structure has a top that is substantially open to an interior of the structure. The structure has a generally pyramid-shaped configuration. The structure has a base that extends outwardly from a bottom of the structure in a generally horizontal plane. The base has an opening therein that opens to the interior of the structure. The concrete material is a sprayable concrete. A plurality of limestone surfaces are adhered on to the exterior of the structure.

The present invention effectively serves to overcome the problems associated with the prior art. In particular, the use of a sprayable concrete, such as GUNITE™ or SHOTCRETE™, provides a superior technique in terms of cost, durability, and strength. This technique also allows for the creation of the maximum available surface area of limestone rock thereon so as to successfully promote marine growth. The process of the present invention creates an artificial reef for the purposes of attracting marine growth, such as corals, fans, banacles and other aquatic life. This, in turn, can form the foundation upon which a balanced reef ecological system can thrive in order to enhance a full spectrum of marine life deployment, from benthic worms to large plagic fish. By providing the maximum surface area of limestone, which is comprised of at least 80% calcium carbonate, these artificial reefs will provide a naturally-occurring compound found in the marine environment that marine wildlife can bore into or attach themselves to gain a foothold on life.

The foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
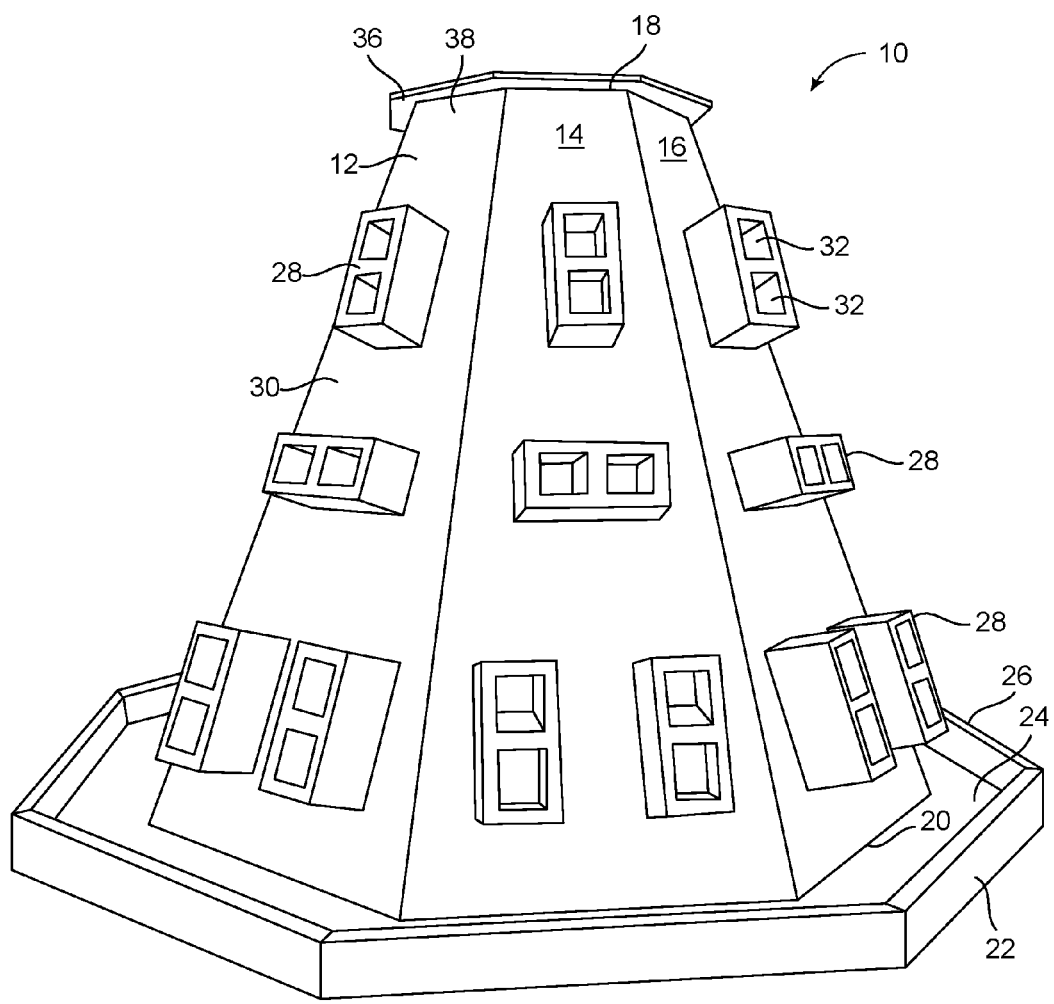
FIG. 1 is a perspective view of the form as used in the process for forming the artificial reef of the present invention.

Referring to FIG. 1, there is shown the form 10 as used in the process for forming the artificial reef of the present invention. The form 10 can be made of any rigid material, such as wood, polymer, steel, or other materials. The form 10 includes a plurality of surfaces 12, 14 and 16 that are arranged in a generally pyramid-shaped configuration. In other words, the form 10 has an upper end 18 and a lower end 20. A base 22 is positioned below the lower end 20 of the form 10. The base 22 has an upper surface 24 upon which the lower end 20 of the form 10 resides. A wall 26 extends upwardly from the top surface 24 so as to define the outer perimeter of the base 22. It can be seen that the outer perimeter of the base 22 is greater than the outer perimeter of the lower end 20 of the form 10. As such, as will be described hereinafter, the sprayable concrete can be utilized so as to cover the upper surface 24 of the base 22.

In FIG. 1, it can be seen that there are a plurality of blackouts 28 that extend outwardly of the outer surface of the form 10. Each of these blockouts 28 is of a cast concrete material. In particular, each of the blackouts 28 is a common cinder block. Each of the blockouts 28 has openings 32 formed therethrough. These openings 32 are conventional holes that are formed in conventional cinder blocks. The blockouts 28 can be secured to the outer surface 30 of the form 10 by a variety of techniques. In particular, small hooks, nails, pegs, or other small projections can extend outwardly of the outer surface 30 so as to be received by one of the openings 32 of the blockouts 28.

These blockouts 28 are conventional cinder blocks which are concrete blocks made from cast concrete, e.g. Portland cement and aggregate, usually sand and fine gravel for high-density blocks. Lower density blocks may use industrial waste, such as an aggregate. Lightweight blocks can also be produced using aerated concrete.

As can be seen in FIG. 1, there is a first set of blockouts 28 which extend in a generally vertical orientation. A second level of blockouts 28 extend in a generally horizontal configuration. A third level of blockouts 28 are shown arranged in pairs in a generally vertical configuration. Although this is the preferred technique for applying the cinder blocks onto the outer surface 30 of the form 10, a wide variety of other configurations of blockouts, such as the cinder blocks, can be utilized in association with the form 10 of the present invention.

A cover 36 is secured to the upper end 38 of the form 10. Cover 38 can cover the interior of the form 10 so as to avoid the introduction of the sprayed concrete into the interior of the form. Additionally, the cover 36 assures that the top of the artificial reef that is produced upon the form 10 is open. The cover 38 can be removed from the form 10 after the concrete has cured upon the form 10.

Figure 2:
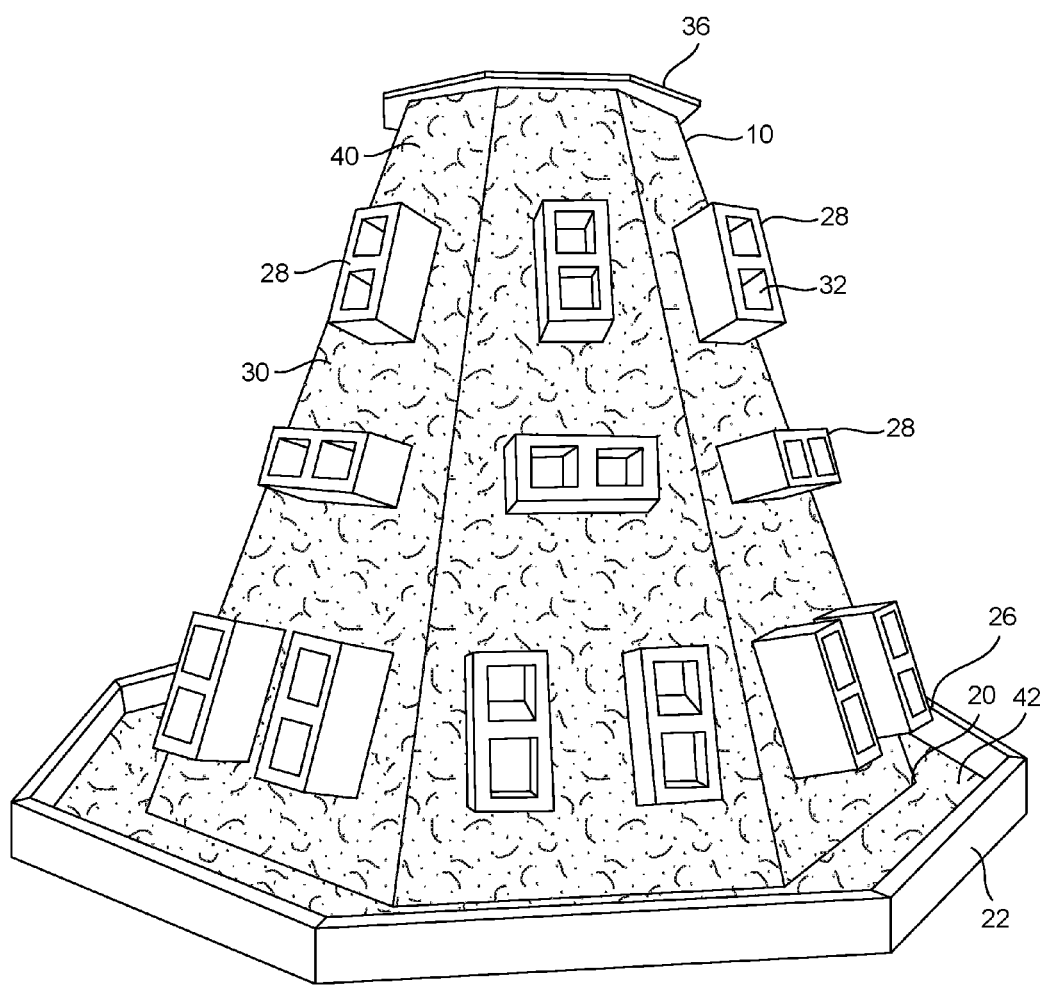
FIG. 2 is a perspective view showing the sprayable concrete is applied on to the surface of the form.

FIG. 2 shows the form 10 with a sprayable concrete 40 sprayed over the outer surface 30 of the form 10. The sprayable concrete 40 is sprayed so as to substantially cover the outer surface of the form 10 and also be sprayed onto a portion of each of the blockouts 28. As such, the sprayable concrete 40 will adhere to the blockouts 28 and will extend over the outer surface 30 of the form 10. A release agent should be applied to the outer surface 30 of the form 10 prior to the application of the sprayable concrete.

The sprayable concrete 40 is in the nature of the GUNITE™ or SHOTCRETE™. The sprayable concrete preferably contains an embedded fiber mesh material that enhances the structural integrity of the structure and minimizes or eliminates the need for the use of steel rebar. The sprayable concrete is dispensed by pneumatic energy so as to be distributed over the outer surfaces of the form 10. The sprayable concrete 40 also serves to fill the area 42 between the lower end 20 of the form 10 and the wall 26 of the base 22. The sprayable concrete 40 is retained within the base 22 by the wall 26.

Ultimately, the sprayable concrete 40 will be cured for a period of time. Once cured, the sprayable concrete will be solid and will adhere to the blockouts 28. As such, the blockouts 28 will be rigidly affixed to the cured sprayable concrete 40. The sprayable concrete 40 is retained over the form 10 by the cover 36.

Unlike U.S. Pat. No. 9,403,287 to the present inventors, the blockouts 28 are fixedly secured to the sprayable concrete 40. As such, there is no need to remove the blockouts after the sprayable concrete 40 has cured. As such, there is no risk of damage to such blockouts. Furthermore, the cost of forming the blockouts is not necessary with the present invention. Additionally, the time and labor required to remove the blockouts is avoided. The cinder blocks, which serve as the blockouts 28, are very inexpensive and readily available. Experimentation has shown that the artificial reef of the present invention, with the cinder blocks, is ultimately less expensive to manufacture than the manufacture of the artificial reef using removable blockouts. Since each of the blockouts 28 has apertures 32 extending therethrough, each of the cinder blocks provides an easy pathway for marine organisms so as to enter the interior of the artificial reef.

Figure 3:
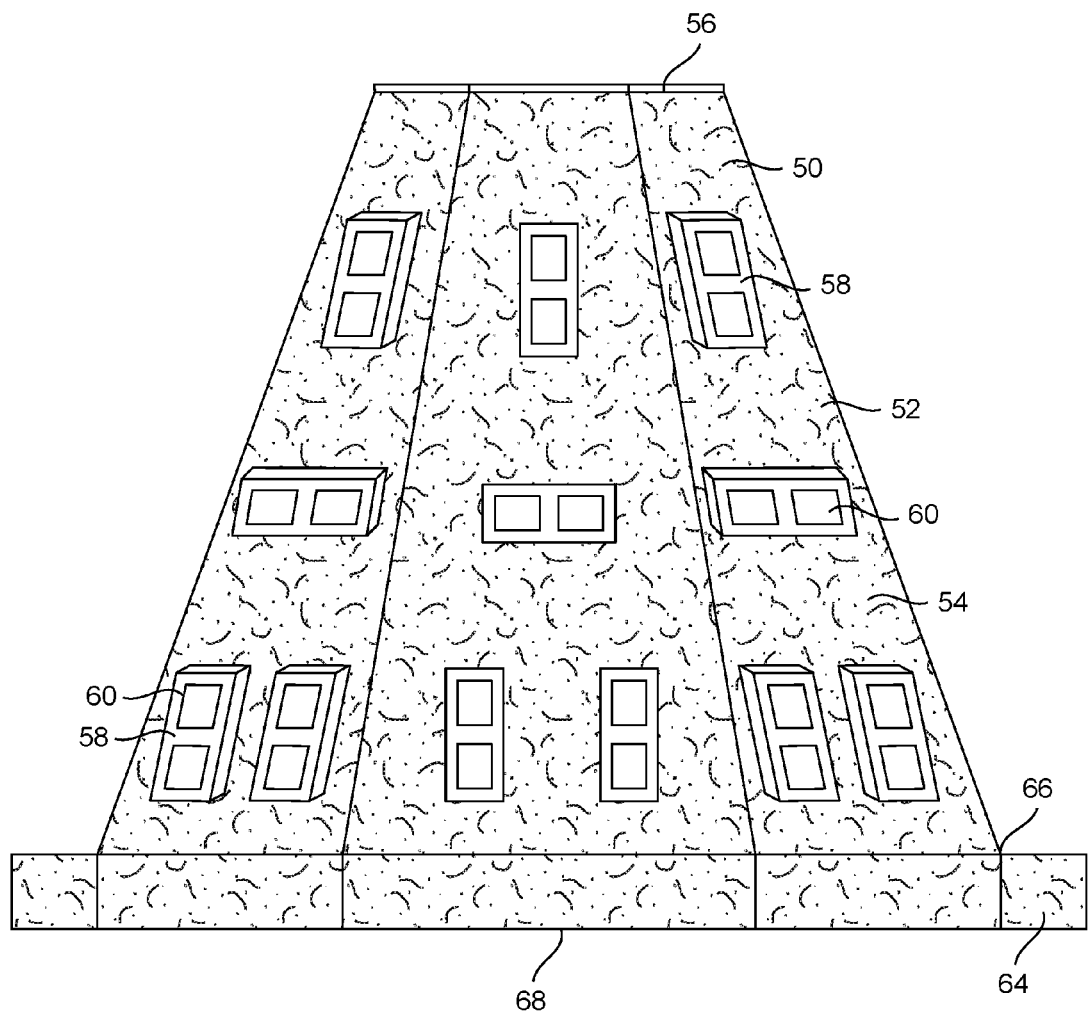
FIG. 3 is a side elevational view showing the artificial reef of the present invention.

FIG. 3 shows that the artificial reef 50 has been removed from the form 10. The artificial reef 50 includes a structure 52 formed of the concrete material. The structure 52 has an exterior 54 formed of the sprayable concrete and an interior 56. The plurality of blockouts are actually cast concrete members 58 that are affixed to the structure 52. Each of the cast concrete members 58 includes apertures 60 extending therethrough. These apertures 60 will communicate between the interior 56 and the exterior 54 of the structure 52. It can be seen that each of the cast concrete members 58 has a portion which extends outwardly of the outer surface of the structure 52. This outwardly extending surface creates an irregularity in the outer surface of the artificial reef 50. As such, this provides an additional area upon which marine organisms can thrive. It also enhances the ability for coral to grow thereon.

It can be seen that the structure 52 has a generally pyramid-shaped configuration. The base 64 extends outwardly from the bottom 66 of the structure 52 in a generally horizontal plane. The base 64 will have an opening in a center 68 thereof which opens to the interior of the structure 52.

Figure 4:
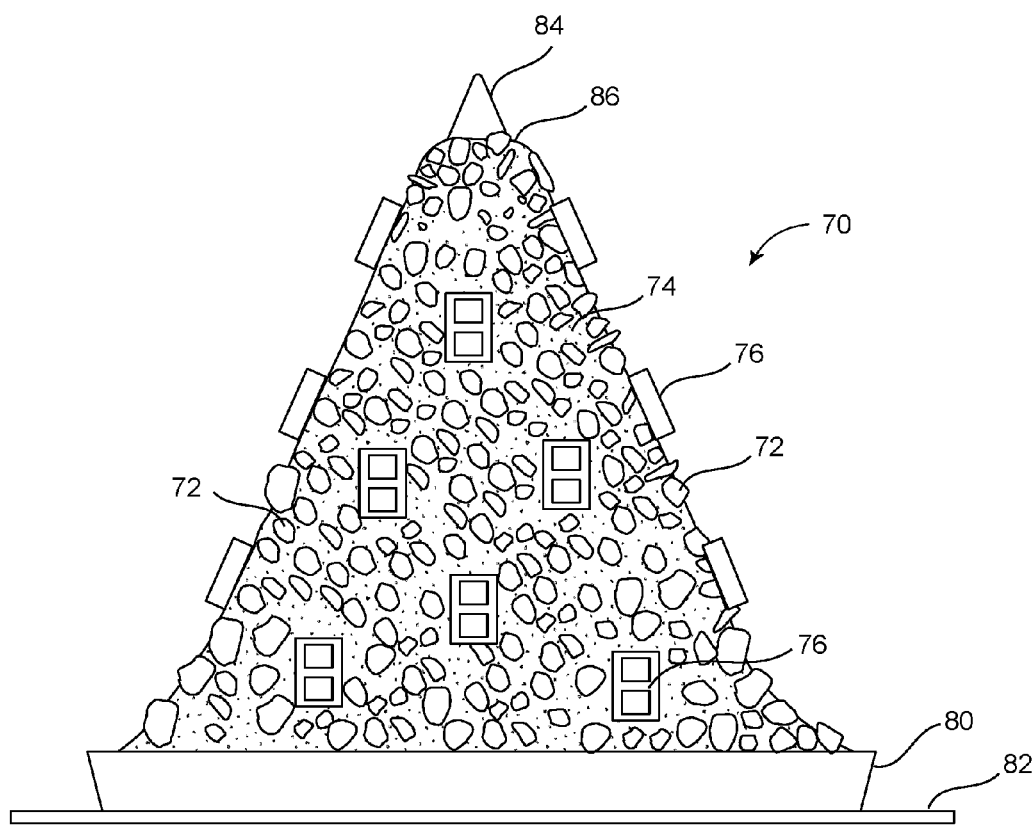
FIG. 4 is a side elevational view showing the artificial reef of the present invention as having limestone surfaces applied to the exterior thereof.

FIG. 4 shows a further development in the artificial reef 70 of the present invention. Artificial reef 70 has a structure similar to that described herein previously. However, in FIG. 4, it can be seen that there are a plurality of limestone surfaces 72 that are adhered to the sprayable concrete material 74. These limestone surfaces 72 are applied to the sprayable concrete 74 during the curing of the sprayable concrete. The blockouts 76 are illustrated as extending outwardly of the outer surface of the artificial reef 70. The base 80 extends in a generally horizontal plane. In FIG. 4, the base 80 is illustrated as resting upon the sea floor 82.

A metal rod 84 is illustrated as extending outwardly of the top 86 of the artificial reef 70. In relation to the previous illustrations, the metal rod 84 has an inverted V-shaped configuration. The metal rod 84 can be applied to the outer surface of the form. The sprayable concrete 74 can then be applied over a portion of the metal rod 84. This portion of the metal rod 84 will be the legs of the V-shaped configuration. The vertex of the metal rod 84 extends outwardly and upwardly above the sprayed concrete material 74. Once the sprayable concrete 74 has fully cured, the metal rod 84 can be utilized for the hoisting, lifting, and manipulating of the artificial reef 70.

In relation to the artificial reefs shown herein, the artificial reef will have a pyramidal-shaped interior which was previously occupied by the form 10. As such, the various openings that are created through the use of the cast concrete members can communicate with this interior so as to allow small fish and organisms to swim therein. In particular, this allows for a small fish to develop and to seek refuge therein by preventing large fish from entering the interior of the artificial reef. As such, the present invention effectively promotes marine growth.

In each of the previous embodiments, it can be seen that the base is formed at the lower end of the pyramid-shaped structure. This base will have a relatively large surface area relative to the lower end of the pyramid-shaped structure. The wide area of the base serves to prevent any sinking of the artificial reef into the subsea floor and prevented the drifting of the artificial reef by way of ocean currents. Additionally, this wide area provides additional surface area for the limestone.

The bent rod 84 extends above the top end 86 of the artificial reef 70. This rod 84 facilitates the ability to manipulate the artificial reef 70. As such, a suitable crane can be used offshore so as to deploy the artificial reef 70. If it is necessary to move the artificial reef 70, then a hook can be utilized so as to grasp the bent portion of the rod 84 for lifting and maneuvering of the artificial reef 70.

The artificial reef in each of the previous embodiments is constructed of the sprayable concrete material so as to provide a hard substrate for the purpose of attracting marine growth, such as algae, truncates, hard and soft corals, fans, sponges, barnacles, oysters and other aquatic life. The structure can be manufactured in a variety of shapes such as tetrahedra, cones, cubes, cylinders, domes, or other shapes. The openings through each of the cast concrete members can also be of different shapes such as circles, squares, rectangles, triangles etc. Calcium carbonate components, such as limestone and/or oyster shell, are also an integral component of the surface. Such calcium carbonate components provide almost 100% coverage of the surface. This provides additional surface area and a suitable material with a proper pH marine growth. The use of the sprayable concrete as the primary structural element allows the unit to be constructed in one step, instead of the multiple steps required by prior art artificial reefs. This provides a substantial savings in time and cost during the manufacturing process. Additionally, the artificial reef described in the embodiments herein is stronger and has greater longevity than previous artificial reefs.

Since the artificial reefs of the present invention utilize a minimal amount of metal or steel, there is little or no metal or steel to degrade over time in seawater. As such, the structural integrity of the artificial reef will have enhanced longevity. The surface area of the footprint of the artificial reef serves to prevent subsidence or scouring in comparison with previous artificial reef designs. The openings in each wall of the cast concrete members in each wall of the artificial reef will allow for an adequate water circulation. This promotes entry into the interior by smaller fish. As such, the smaller fish are provided with refuge and protection from predation.

The foregoing disclosure and description of the invention is illustrative and explanatory thereof. Various changes in the details of the illustrated construction, or the steps of this described process, can be made within the scope of the present claims without departing from the true spirit of the invention. The present invention should only be limited by the following claims and their legal equivalents.

We claim:

1. A process for forming an artificial reef, the process comprising:
    forming a form having a geometric shape;
    applying at least one blockout onto a surface of the form such that the blockout extends outwardly of the surface of the form;
    applying a sprayable concrete over the form and over a portion of the blockout;
    curing the sprayable concrete on the form for a period of time such that the sprayable concrete adheres to the blockout and such that the blockout extends substantially outwardly beyond an outer surface of the cured sprayable concrete; and
    removing the cured sprayable concrete and the adhered blockout together from the surface of the form.

2. The process of claim 1, the blockout being of a cast concrete material.

3. The process of claim 2, the blockout being a cinder block.

4. The process of claim 1, the blockout having openings therethrough such that the openings open to an interior of the artificial reef.

5. The process of claim 1, further comprising:
    applying a rod onto the form so as to have a portion extending outwardly of the surface of the form, the step of applying the sprayable concrete comprising spraying the sprayable concrete over a portion of said rod.

6. The process of claim 1, the step of forming comprising:
    forming a generally pyramid-shaped form having an upper end and a lower end;
    forming a base; and
    placing the said lower end of said generally pyramid-shaped form upon said base.

7. The process of claim 6, said base having an upper surface extending outwardly of a perimeter of said lower end of said generally pyramid-shape form.

8. The process of claim 7, the step of applying the sprayable concrete comprising: spraying the sprayable concrete onto said upper surface of said base outwardly of said perimeter of said lower end of said generally pyramid-shaped form.

9. The process of claim 1, further comprising:
    applying a plurality of limestone surfaces onto an outer surface of the sprayable concrete during the step of curing.

10. The process of claim 1, further comprising:
    applying a concrete release agent on to the form prior to the step of applying the sprayable concrete.

11. A process for forming a artificial reef, the process comprising:
    forming a form having a geometric shape;
    applying at least one cinder block onto a surface of the form such that the cinder block extends outwardly of the surface of the form;
    spraying a concrete material over the form and over a portion of the cinder block;
    curing the sprayed concrete material on the form for a period of time such that the sprayed concrete material adheres to the cinder block and such that the cinder block extends substantially outwardly beyond an outer surface of the cured sprayable concrete; and
    removing the cured sprayable concrete material and the adhered cinder block together from the surface of the form.

* * * * *

UNITED STATES PATENT AND TRADEMARK OFFICE
CERTIFICATE OF CORRECTION

PATENT NO. : 9,744,687 B2  
APPLICATION NO. : 15/225318  
DATED : August 29, 2017  
INVENTOR(S) : Hilton et al.

Page 1 of 1

It is certified that error appears in the above-identified patent and that said Letters Patent is hereby corrected as shown below:

On the Title Page

Item (72) should read:  
--Hilton; Thomas J. (Arcola, TX), Bauer; Wayne Evan (Cape Coral, FL)--

Signed and Sealed this  
Sixteenth Day of April, 2019

Andrei Iancu  
*Director of the United States Patent and Trademark Office*